United States Patent
Makineedi et al.

(10) Patent No.: US 10,996,990 B2
(45) Date of Patent: May 4, 2021

(54) INTERRUPT CONTEXT SWITCHING USING DEDICATED PROCESSORS

(71) Applicant: International Business Machines Corporation, Armonk, NY (US)

(72) Inventors: Sreenivas Makineedi, Round Rock, TX (US); Douglas Griffith, Burnet, TX (US); Srinivasa Rao Muppala, Round Rock, TX (US); Anil Kalavakolanu, Austin, TX (US); Shanna Beck, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 16/192,011

(22) Filed: Nov. 15, 2018

(65) Prior Publication Data

US 2020/0159580 A1 May 21, 2020

(51) Int. Cl.
*G06F 9/50* (2006.01)
*G06F 9/48* (2006.01)
*G06F 21/55* (2013.01)
*H04L 29/06* (2006.01)

(52) U.S. Cl.
CPC ............ *G06F 9/505* (2013.01); *G06F 9/4812* (2013.01); *G06F 21/552* (2013.01); *H04L 63/145* (2013.01)

(58) Field of Classification Search
None
See application file for complete search history.

(56) References Cited

U.S. PATENT DOCUMENTS

| | | | | |
|---|---|---|---|---|
| 7,603,713 | B1 * | 10/2009 | Belov | G06F 11/3652 |
| | | | | 703/13 |
| 7,971,205 | B2 * | 6/2011 | Heffley | G06F 9/485 |
| | | | | 710/262 |
| 8,176,477 | B2 * | 5/2012 | Wu | G06F 21/56 |
| | | | | 713/188 |
| 9,703,957 | B2 * | 7/2017 | Sallam | G06F 21/566 |
| 10,380,336 | B2 * | 8/2019 | Suginaka | G06F 11/30 |
| 10,642,753 | B1 * | 5/2020 | Steinberg | G06F 9/45558 |
| 2004/0111548 | A1 | 6/2004 | Arimilli et al. | |
| 2010/0205602 | A1 | 8/2010 | Zedlewski et al. | |

(Continued)

OTHER PUBLICATIONS

Navarro et al. "Bridging the Semantic Gap to Mitigate Kernel-Level Keyloggers," 2012 IEEE, pp. 97-103.*

(Continued)

*Primary Examiner* — Van H Nguyen
(74) *Attorney, Agent, or Firm* — Cantor Colburn LLP; David Quinn (57) ABSTRACT

Embodiments include method, systems and computer program products for performing Spectre mitigation on a workload. The method includes starting, by at least one processor of a plurality of processors, a process. The at least one processor determines that the process is a kernel process. The at least one processor determines that an interrupt has occurred in response to the determination that the process is a kernel process. The at least one processor processes the interrupt in response to determining that an interrupt has occurred. The at least one processor suppresses a malware mitigation to be applied to the kernel process in response to interrupt being processed.

11 Claims, 5 Drawing Sheets

(56) References Cited

U.S. PATENT DOCUMENTS

2012/0227042 A1 9/2012 Zedlewski et al.
2018/0351968 A1* 12/2018 MacLeod .............. G06F 21/566
2019/0205533 A1* 7/2019 Diehl .................... H04L 9/3268

OTHER PUBLICATIONS

Pék et al. "Towards the automated detection of unknown malware on live systems," 2014 IEEE, pp. 847-852.*
Huang et al., "Effectively Measure and Reduce Kernel Latencies for Real-time Constraints," Embedded Linux Conference 2017, 61 pgs.
Authors et al: Disclosed Anonymously, "A System and Method for Smart Workload Management on Asymmetric Multicore Architectures," An IP.com Prior Art Database Technical Disclosure, IP.com No. IPCOM000236928D, IP.com Electronic Publication Date: May 22, 2014, 7 pgs.
Authors et al: IBM, "System and Method to Optimize Cache and Memory Affinity in a Virtualized Environment", An IP.com Prior Art Database Technical Disclosure, Original Publication Date: Feb. 9, 2006, IP.com No. IPCOM00133807D, IP.com Electronic Publication Date: Feb. 9, 2006, 5 pgs.

* cited by examiner

INTERRUPT CONTEXT SWITCHING USING DEDICATED PROCESSORS

BACKGROUND

The present invention relates to handling interrupts in a computer system, and more particularly to increasing interrupt handling efficiency in a logically partitioned computer system.

Computer systems, processors, caches, I/O devices and other devices in the computer architecture access data in memory using one or more memory controllers. The processors can be general purpose and include multiple cores and/or employ simultaneous multi-threading. Computers systems can utilize an operating system ("OS") as an interface between their applications and the computer hardware.

SUMMARY

Embodiments of the invention are directed to a method of performing malware mitigation on a workload. A non-limiting example of the computer-implemented method includes starting, by at least one processor of a plurality of processors, a process. The at least one processor determines that the process is a kernel process. The at least one processor determines that an interrupt has occurred in response to the determination that the process is a kernel process. The at least one processor processes the interrupt in response to determining that an interrupt has occurred. The at least one processor suppresses a malware mitigation to be applied to the kernel process in response to interrupt being processed.

Embodiments of the invention are directed to a computer program product that can include a storage medium readable by a processing circuit that can store instructions for execution by the processing circuit for performing a method of performing malware mitigation on a workload. A non-limiting example of the method includes starting a process. At least one processor of a plurality of processors determines that that the process is a kernel process. The at least one processor determines that an interrupt has occurred in response to the determination that the process is a kernel process. The at least one processor processes the interrupt in response to determining that an interrupt has occurred. The at least one processor suppresses a malware mitigation to be applied to the kernel process in response to interrupt being processed.

Embodiments of the invention are directed to a system. The system includes a plurality of processors in communication with a memory. The system includes a plurality of adapters coupled to the plurality of processors. At least one processor of the plurality of processors is operable to start a process. The at least one processor determines that the process is a kernel process. The at least one processor determines that an interrupt has occurred in response to the determination that the process is a kernel process. The at least one processor processes the interrupt in response to determining that an interrupt has occurred. The at least one processor suppresses a malware mitigation to be applied to the kernel process in response to interrupt being processed.

Additional technical features and benefits are realized through the techniques of one or more embodiments the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection".

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In accordance with exemplary embodiments of the disclosure, methods, systems, and computer program products for operating a computer system in consideration of malware mitigation is described herewith.

Computing devices and especially network connected devices are susceptible to a range of attacks. Malware infected end user devices can create a problematic environment, especially when using or exchanging confidential data. Recent successful computer attacks like Meltdown and Spectre demonstrate that Virtual Machines or hypervisors and process isolation are vulnerable. Potential side channel attacks can pose a real problem (e.g., spoofing user accounts) that must be considered, especially for mission critical applications.

One solution to prevent or mitigate such attacks is to invalidate an L1 data cache and translation lookaside buffers (TLBs) during context switches between a user and a kernel operating on a given system, the user or system and interrupts occurring on the system, and/or the system and the hypervisor. This invalidation prevents malicious code like Meltdown and Spectre from obtaining access to the data outside a confined region based on assigned data privilege. However, invalidations in such instances detrimentally impact the performance of the system because the invalidation of the L1 data cache requires compute cycles to flush/remove data from the L1 data cache, but additional involves compute cycles to refill the data cache with data.

Turning now to an overview of aspects of the present invention, one or more embodiments of the invention provide methods, systems, structures and computer program products configured to identify interrupts occurring on a kernel process, as well as kernel threads and user threads. The identification of interrupts associated with kernel processes and kernel threads can be used to suppress malware mitigation (e.g., Spectre mitigation) for the interrupted kernel process and/or a kernel thread in response to encountering a context switch. Accordingly, L1 cache and/or TLB flushes of the present invention are minimized when a context switch is encountered by performing malware mitigation on non-kernel related processes saving processing time needed to re-populate the L1 cache and/or TLB.

Figure 1:
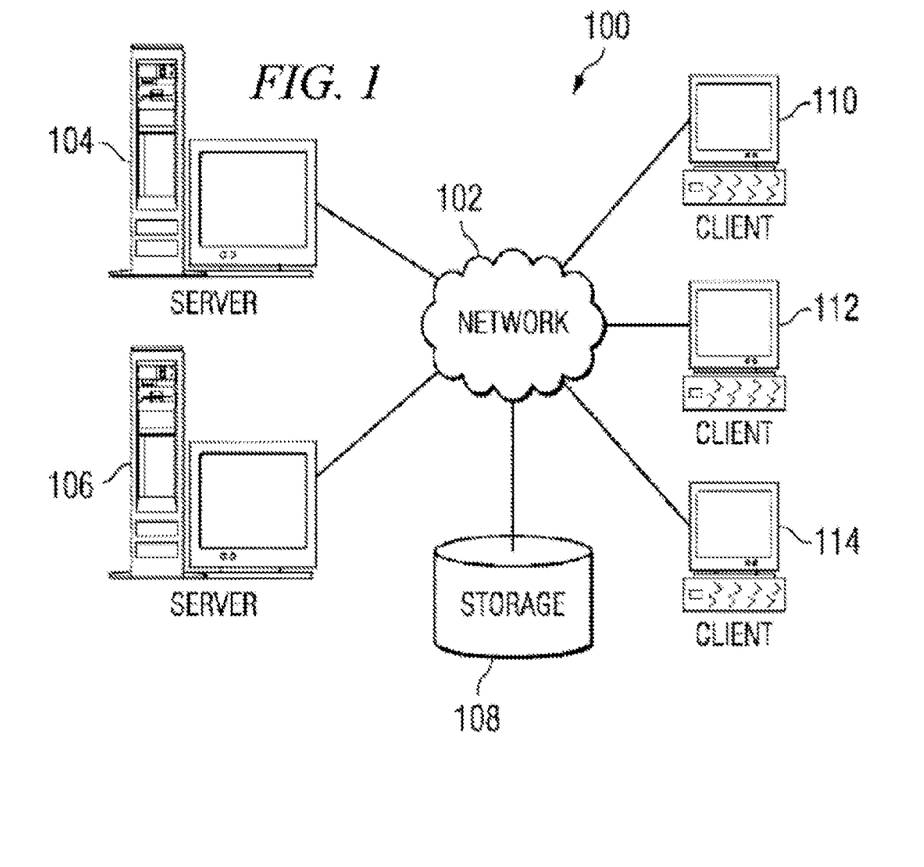
FIG. 1 is an exemplary diagram of a distributed data processing system in which exemplary aspects of the present invention may be implemented.

With reference now to the figures, FIG. 1 depicts a pictorial representation of an exemplary distributed data processing system in which aspects of the illustrative embodiments of the present invention may be implemented. Distributed data processing system 100 may include a network of computers in which instances of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the exemplary embodiments of the present invention may be implemented.

Figure 2:
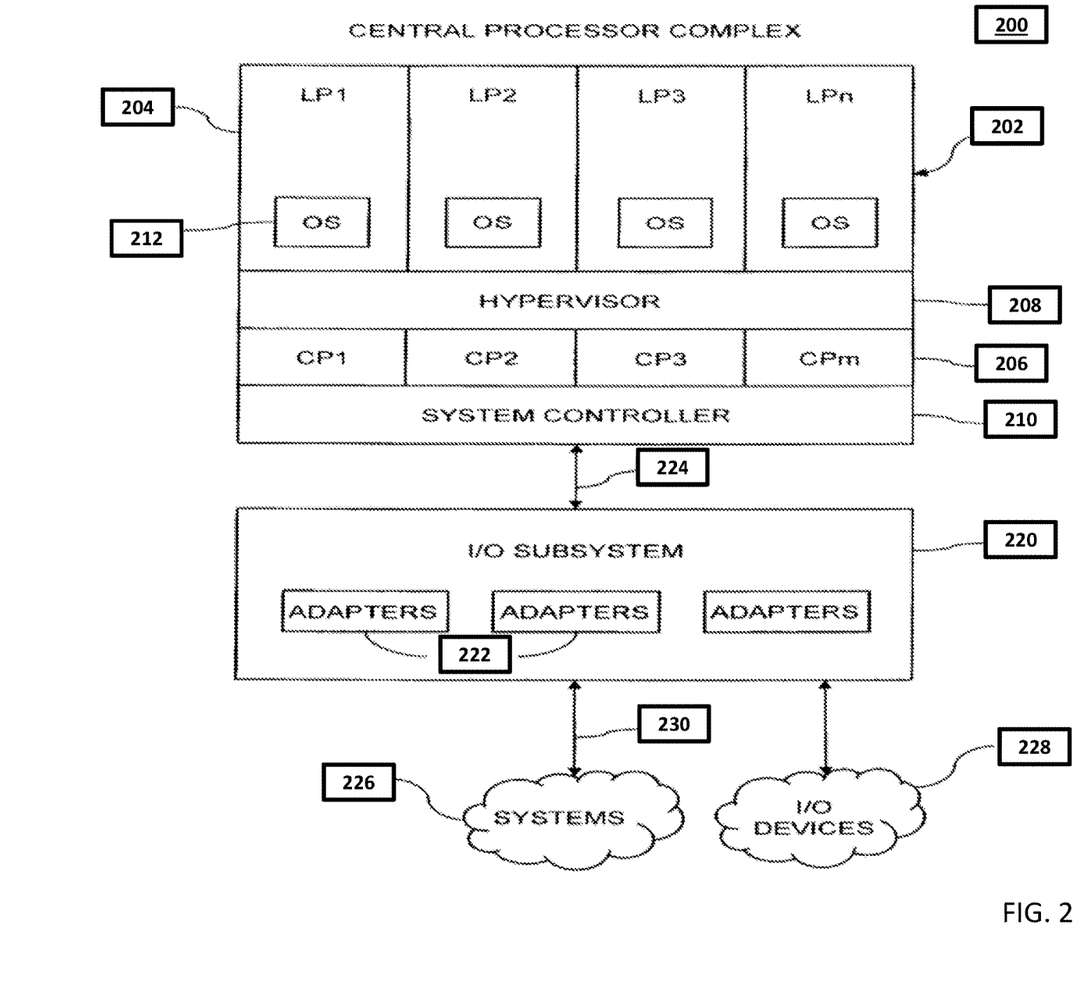
FIG. 2 is a block diagram illustrating a block diagram of an exemplary computing environment is shown in which aspects of the exemplary embodiments of the present invention may be implemented.

With reference now to FIG. 2, a block diagram of an exemplary computing environment is shown in which aspects of the exemplary embodiments of the present invention may be implemented. Computing environment 200 includes, for instance, a Central Processor Complex (CPC) 202 coupled to an input/output (I/O) subsystem 220. The CPC 202 in the present example includes one or more partitions 204, e.g., logical partitions LP1-LPn, and one or more CPUs/central processors 206, e.g., CP1-CPm. The CPC 202 further includes a hypervisor 208, e.g., a logical partition manager, and a system controller 210, each of which is described below. The I/O subsystem 220 includes a number of I/O adapters 222 being arranged logically and/or physically external to one or more of the central processors 206.

Each logical partition 204 is capable of functioning as a separate (virtual) system. That is, each logical partition can be independently reset, initially loaded with an operating system (OS), if desired, and operate with different programs. An operating system (e.g., OS 212) or application program running (not shown) in a logical partition appears to have access to a full and complete system, but in reality, only a portion of it is available. A combination of hardware and firmware keeps a program in a logical partition from interfering with a program in a different logical partition. This allows several different logical partitions to operate on a single processor or multiple physical processors in a time sliced manner. In this particular example, each logical partition has a resident OS 212 which may differ for one or more logical partitions. In addition, each logical partition has assigned thereto a portion of system main storage (memory), which is referred to as a "zone".

A logical partition 204 includes one or more logical processors (not shown). Each central processor 206 may be permanently allocated to a particular logical processor, or may be in a pool of central processors 206 available for dynamic allocation to any group of logical processors, possibly spanning multiple logical partitions 204. Logical partitions 204 are managed by hypervisor 208 implemented by firmware running on the central processors 206. Logical partitions 204 and hypervisor 208 can each comprise one or more programs residing in respective portions of central storage associated with the central processors 206.

The hypervisor 208 allows multiple operating systems, (e.g., OS 212) to run on a host computer (e.g., computing environment 200) at the same time by providing each operating system with a set of virtual resources. These virtual resources provide each operating system a portion of the actual resources of the computer. These portions are usually implemented as time slices of the total time the resources are available for use.

The O/S 212 can include a kernel (not shown). The kernel can manage a system's resources and facilitate communication between hardware and software components. As a basic component of an operating system, the kernel provides abstraction layers for hardware, especially for memory, processors and I/O that allows hardware and software to communicate. The kernel also makes these resources available to applications and other operating system services through inter-process communication mechanisms and system calls.

The O/S 212 can also include an interrupt handler (not shown). The interrupt handler performs appropriate processing on the interrupt to determine how to handle the occurrence of the event. The interrupt handler, also known as an interrupt service routine (ISR), is a callback function (e.g., implemented in firmware, an operating system (OS), or a device driver) whose execution is triggered by an interrupt. Interrupt handlers perform various interrupt dependent functions. For example, pressing a key on a computer keyboard or moving a computer mouse triggers interrupts that call respective interrupt handlers to read a key or a mouse position and copy associated information into the memory of a computer. In data processing systems, an interrupt controller may be implemented to combine multiple interrupt sources onto one or more processor exception lines, while facilitating the assignment of priority levels to different interrupts.

Central processors 206 can be coupled to system controller 210. System controller 210 can preferably be a hardware component that controls access to memory and caches within the central processors 206 and communicates between the processors and input/output subsystem 220. The system controller 210 can be responsible for the queuing, serialization and execution of requests made by the central processors 206 and the I/O subsystem 220. In one example, the system controller 210 is responsible for sending commands to particular central processors 206 and/or broadcasting commands to multiple central processors 206. The system controller 210 may be a centralized component or its functions may be distributed.

At least one of the mentioned I/O adapters 222 can initiate the setting of an interrupt, such as an I/O interrupt, at one or more of the central processors 206. An interrupt is an asynchronous interruption event that is not associated with the instruction that is executing when the interrupt occurs. That is, an interruption is often caused by some event outside the processor, for example, an input from an input/output (I/O) device, a call for an operation from another processor, etc. Other interrupts may be caused internally, for example, by the expiration of a timer that controls task switching.

For this purpose, the one of the I/O adapters 222 can directly send a request to a system controller 210 coupled to a particular I/O adapter 222 and the central processors 206. The request designates a particular zone and I/O interrupt subclass within the processing environment for which a pending interrupt is to be set. The system controller 210 builds a command based on the request and sends the command to one or more central processors 206. In response to receiving that command at least one central processor 206 can set one or more pending interruption array indicators, e.g., an indicator in a pending interruption array and a filter pending interruption array of an associated central processor 206 for the zone and interruption subclass designated in the command.

The I/O subsystem 220 is preferably coupled to the system controller 210 via one or more buses 224. Further, the I/O subsystem 220 can be coupled to other systems 226 and/or to I/O devices 228 (e.g., control units, input devices, printers, other output devices, etc.) via one or more links 230. The I/O adapters 222 of the I/O subsystem 220 transform the protocol of the system controller 210 to the protocols of the one or more links 230 (and vice versa) to allow efficient communication between the CPC 202 and other systems and/or I/O devices. The I/O adapter 222 receives packets over the one or more links 230, and in response thereto, may determine that an interruption initiative is to be set pending at the central processors 206 of the processing environment. When an interruption initiative is to be set, the I/O adapter 222 can directly send a request to the system controller, and the system controller instructs the central processors 206 to set the pending interruption initiatives.

Figure 3:
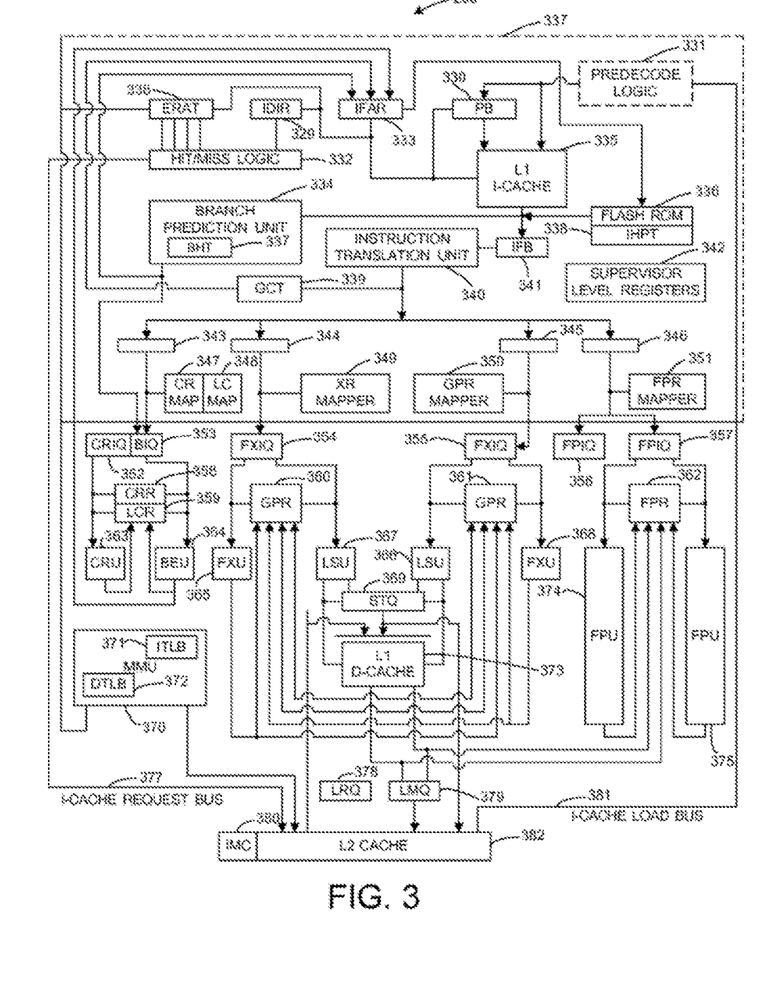
FIG. 3 is a block diagram illustrating a block diagram of an exemplary processing unit is shown in which aspects of the exemplary embodiments of the present invention may be implemented.

FIG. 3 illustrates an exemplary processing unit, such as a CPU 206 of FIG. 2 in which aspects of the exemplary embodiments of the present invention may be implemented. Processing unit 206 can include an on-chip multi-level cache hierarchy including a unified level-two (L2) cache 382 and bifurcated level-one (L1) instruction (I) and data (D) caches 335 and 373, respectively.

Instructions are fetched for processing from L1 I-cache 335 in response to an effective address (EA) residing in instruction fetch address register (IFAR) 333. During each cycle, a new instruction fetch address may be loaded into IFAR 333 from one of three sources: branch prediction unit (BPU) 334, which provides speculative target path and sequential addresses resulting from the prediction of conditional branch instructions, global completion table (GCT) 339, which provides flush and interrupt addresses, and branch execution unit (BEU) 364, which provides non-speculative addresses resulting from the resolution of predicted conditional branch instructions.

An effective address (EA), such as the instruction fetch address within IFAR 333, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within processing unit 206, effective-to-real address translation is performed by memory management units (MMUs) and associated address translation facilities. Preferably, a separate MMU is provided for instruction accesses and data accesses. In FIG. 3, a single MMU 370 is illustrated, for purposes of clarity, showing connections only to instruction sequencing unit, indicated generally at 337. However, it is understood by those skilled in the art that MMU 370 also preferably includes connections (not shown) to load/store units (LSUs) 366 and 367 and other components necessary for managing memory accesses. MMU 370 includes data translation lookaside buffer (DTLB) 372 and instruction translation lookaside buffer (ITLB) 371. Each TLB contains recently referenced page table entries, which are accessed to translate EAs to RAs for data (DTLB 372) or instructions (ITLB 371). Recently referenced EA-to-RA translations from ITLB 371 are cached in effective-to-real address table (ERAT) 328.

If hit/miss logic 332 determines, after translation of the EA contained in IFAR 333 by ERAT 328 and lookup of the real address (RA) in I-cache directory (IDIR) 329, that the cache line of instructions corresponding to the EA in IFAR 333 does not reside in L1 I-cache 335, then hit/miss logic 332 provides the RA to L2 cache 382 as a request address via I-cache request bus 377. Such request addresses may also be generated by prefetch logic within L2 cache 382 based upon recent access patterns. In response to a request address, L2 cache 382 outputs a cache line of instructions, which are loaded into prefetch buffer (PB) 330 and LIT-cache 335 via I-cache reload bus 381, possibly after passing through optional predecode logic 331.

Once the cache line specified by the EA in IFAR 333 resides in L1 I-cache 335, L1 I-cache 335 outputs the cache line to both branch prediction unit (BPU) 334 and to instruction fetch buffer (IFB) 341. BPU 334 scans the cache line of instructions for branch instructions and predicts the outcome of conditional branch instructions, if any. Following a branch prediction, BPU 334 furnishes a speculative instruction fetch address to IFAR 333, as discussed above, and passes the prediction to branch instruction queue (BIQ) 353 so that the accuracy of the prediction can be determined when the conditional branch instruction is subsequently resolved by branch execution unit (BEU) 364.

IFB 341 temporarily buffers the cache line of instructions received from L1 I-cache 335 until the cache line of instructions can be translated by instruction translation unit (ITU) 340. ITU 340 translates instructions from user instruction set architecture (UISA) instructions into a possibly different number of internal ISA (IISA) instructions that are directly executable by the BEU 364. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table (GCT) 339 to an instruction group, the members of which are permitted to be dispatched and executed out-of-order with respect to one another. Global completion table 339 tracks each instruction group for which execution has yet to be completed by at least one associated EA, which is preferably the EA of the oldest instruction in the instruction group.

Following UISA-to-IISA instruction translation, instructions are dispatched to one of latches 343, 344, 345 and 346, possibly out-of-order, based upon instruction type. That is, branch instructions and other condition register (CR) modifying instructions are dispatched to latch 343, fixed-point and load-store instructions are dispatched to either of latches 344 and 345, and floating-point instructions are dispatched to latch 346. Each instruction requiring a rename register for temporarily storing execution results is then assigned one or more rename registers by the appropriate one of CR mapper 347, link and count (LC) register mapper 348, exception register (XR) mapper 349, general-purpose register (GPR) mapper 350, and floating-point register (FPR) mapper 351.

The dispatched instructions are then temporarily placed in an appropriate one of CR issue queue (CRIQ) 352, branch issue queue (BIQ) 353, fixed-point issue queues (FXIQs) 354 and 355, and floating-point issue queues (FPIQs) 356 and 357. From issue queues 352, 353, 354, 355, 356 and 357, instructions can be issued opportunistically to the BEU 364 for execution as long as data dependencies and anti-dependencies are observed. The instructions, however, are maintained in issue queues 352-357 until execution of the instructions is complete and the result data, if any, are written back, in case any of the instructions needs to be reissued.

As illustrated, the execution units of processing unit 206 include a CR unit (CRU) 363 for executing CR-modifying instructions, a branch execution unit (BEU) 364 for executing branch instructions, two fixed-point units (FXUs) 365 and 368 for executing fixed-point instructions, two load-store units (LSUs) 366 and 367 for executing load and store instructions, and two floating-point units (FPUs) 374 and 375 for executing floating-point instructions. Each of execution units 363-375 is preferably implemented as an execution pipeline having a number of pipeline stages.

During execution within one of execution units 363-375, an instruction receives operands, if any, from one or more architected and/or rename registers within a register file coupled to the execution unit. When executing CR-modifying or CR-dependent instructions, CRU 363 and BEU 364 access the CR register file 358, which in an embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 359 contains a count register (CTR), a link register (LR) and rename registers of each, by which BEU 364 may also resolve conditional branches to obtain a path address. General-purpose register files (GPRs) 360 and 361, which are synchronized, duplicate register files, store fixed-point and integer values accessed and produced by FXUs 365 and 368 and LSUs 366 and 367. Floating-point register file (FPR) 362, which like GPRs 360 and 361 may also be implemented as duplicate sets of synchronized registers, contains floating-point values that result from the execution of floating-point instructions by FPUs 374 and 375 and floating-point load instructions by LSUs 366 and 367.

After an execution unit finishes execution of an instruction, the execution notifies GCT 339, which schedules completion of instructions in program order. To complete an instruction executed by one of CRU 363, FXUs 365 and 368 or FPUs 374 and 375, GCT 339 signals the execution unit, which writes back the result data, if any, from the assigned rename register(s) to one or more architected registers within the appropriate register file. The instruction is then removed from the issue queue, and once all instructions within its instruction group have completed, is removed from GCT 339. Other types of instructions, however, are completed differently.

When BEU 364 resolves a conditional branch instruction and determines the path address of the execution path that should be taken, the path address is compared against the speculative path address predicted by BPU 334. If the path addresses match, no further processing is required. If, however, the calculated path address does not match the predicted path address, BEU 364 supplies the correct path address to IFAR 333. In either event, the branch instruction can then be removed from BIQ 353, and when all other instructions within the same instruction group have completed, from GCT 339.

Following execution of a load instruction, the effective address computed by executing the load instruction is translated to a real address by a data ERAT (not illustrated) and then provided to L1 D-cache 373 as a request address. At this point, the load instruction is removed from FXIQ 354 or 355 and placed in load reorder queue (LRQ) 378 until the indicated load is performed. If the request address misses in L1 D-cache 373, the request address is placed in load miss queue (LMQ) 379, from which the requested data is retrieved from L2 cache 382 (which is under the control of an Instruction Memory Controller (IMC) 380), and failing that, from another processing unit 206 or from system memory. LRQ 378 snoops exclusive access requests (e.g., read-with-intent-to-modify), flushes or kills on an interconnect fabric against loads in flight, and if a hit occurs, cancels and reissues the load instruction. Store instructions are similarly completed utilizing a store queue (STQ) 369 into which effective addresses for stores are loaded following execution of the store instructions. From STQ 369, data can be stored into either or both of L1 D-cache 373 and L2 cache 382.

The states of a processor include stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve the efficiency of execution of a process but is not required to achieve an architecturally correct result. In processing unit 206, the hard state includes the contents of user-level registers, such as CRR 358, LCR 359, GPRs 360 and 361, FPR 362, as well as supervisor level registers 342. The soft state includes both "performance-critical" information, such as the contents of L-1 I-cache 335, L-1 D-cache 373, address translation information such as DTLB 372 and ITLB 371, and less critical information, such as BHT 337 and all or part of the content of L2 cache 382.

The hard architectural state is stored to system memory through the load/store unit of the processor core, which blocks execution of the interrupt handler or another process for a number of processor clock cycles. Alternatively, upon receipt of an interrupt, processing unit 206 suspends execution of a currently executing process, such that the hard architectural state stored in hard state registers is then copied directly to shadow register. The shadow copy of the hard architectural state, which is preferably non-executable when viewed by the processing unit 206, is then stored to system memory.

Saving soft states differs from saving hard states. When an interrupt handler is executed by a conventional processor, the soft state of the interrupted process is typically polluted. That is, execution of the interrupt handler software populates the processor's caches, address translation facilities, and history tables with data (including instructions) that are used by the interrupt handler. Thus, when the interrupted process resumes after the interrupt is handled, the process can experience increased instruction and data cache misses, increased translation misses, and increased branch mis-predictions. Such misses and mis-predictions severely degrade process performance until the information related to interrupt handling is purged from the processor and the caches and other components storing the process' soft state are repopulated with information relating to the process.

Figure 4:
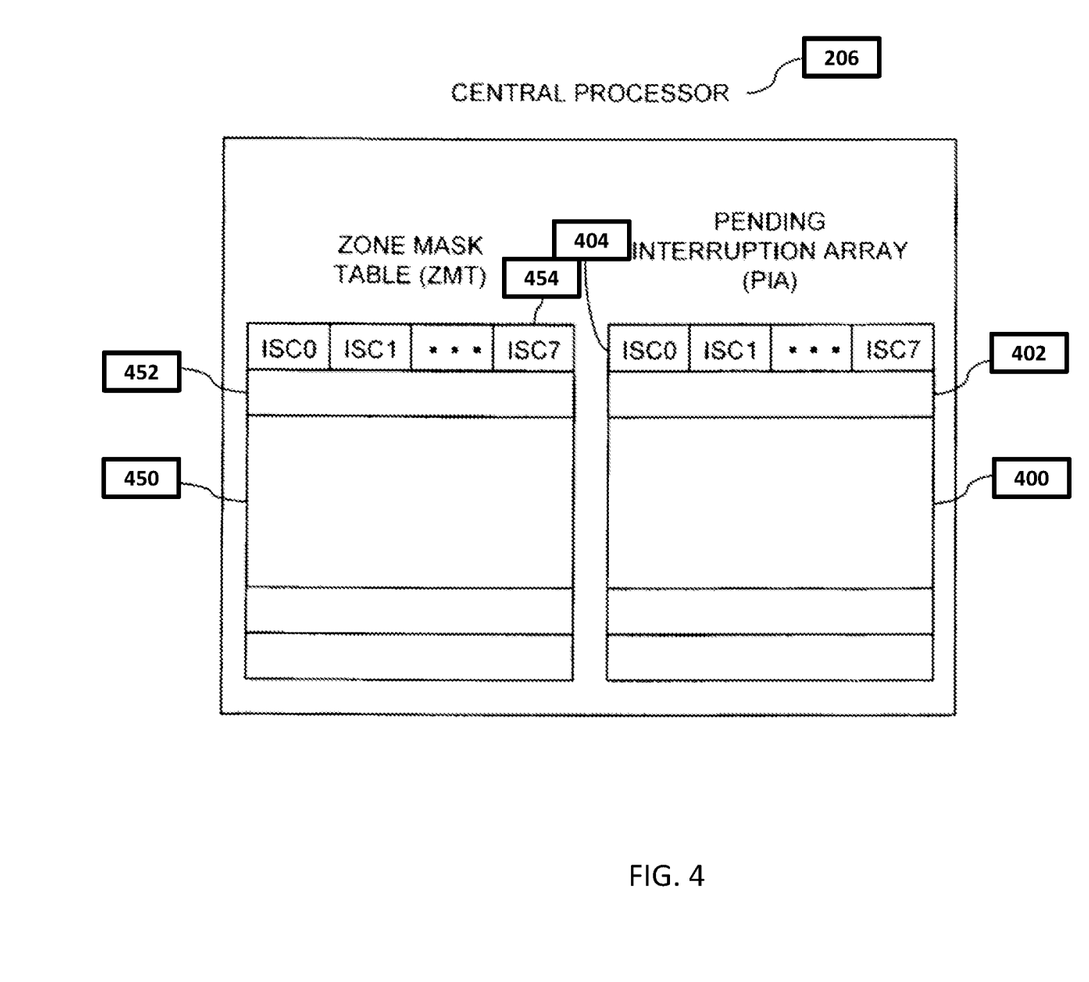
FIG. 4 is a pending interruption array for setting initiatives using indicators is shown in which aspects of the exemplary embodiments of the present invention may be implemented.

FIG. 4 illustrates a block diagram of a pending interruption array (PIA) 400 in which aspects of the exemplary embodiments of the present invention may be implemented. The PIA 400 is a hardware component residing in a central processor 206. The PIA 400 includes an entry, e.g., a row 302, for each memory assigned to a logical partition (zone) within the processing environment. In one example, the processing environment includes 64 zones, and therefore, there are 64 entries in the pending interruption array. Each entry includes an indicator 404 for each I/O interruption subclass (ISC) associated with the zone. An interruption subclass represents one of a plurality of possible subclasses of interruption, and in one example, there are eight interruption subclasses. Each interruption subclass is associated with one or more sources of the interruption. When a bit is turned on in the pending interruption array, it indicates that an interruption is pending for that particular interruption subclass of that zone (i.e., ZONE.ISC).

Each interruption subclass (e.g., ISCO-ISC7) has a corresponding I/O interruption queue that holds one or more pending interruptions. The I/O interruption queues are located within system memory, and each has an interruption queue header (IQH) associated therewith. The IQH can include the initiatives made pending. To handle an interruption made pending, a zone mask table (ZMT) 450 can be employed. The ZMT 450 can also have an entry 452 for each zone of the processing complex and an indicator 454 for each interruption subclass of each zone.

All central processors 206 have the technical ability to accept and handle I/O interrupts of all zones, but only those central processors 206 enabled for a particular I/O interrupt for which a ZMT mask bit can be set is enabled to process the particular I/O interrupt. Since each central processor 206 may be enabled for several I/O interrupts, prioritization logic exists to present only one pending I/O interrupt at a time to an interrupt handler (not shown).

The interrupt handler can employ different approaches to process I/O interrupts during a context switch. For example, a round robin approach can be employed that that selects the next thread in a list of threads for processing. The thread chosen can be restricted to only threads that have last run on the current central processor 206. This round robin approach ensures that all threads in the list of threads are processed even if instructions and/or associated data were run on another CPU. The interrupt handler can also manage all requests or completed I/O operations that need the kernel's services. The kernel may also include a scheduler (not shown) that determines which programs share the kernel's processing time and in what order. The kernel may also include a supervisor that allocates use of a computing device to each kernel process (kproc) when it is scheduled. The kproc can operate in a kernel protection domain and can control one or more kernel threads.

The kernel may also include a control point controller (not shown) associated with a kproc that can save state data for the kproc. After an interrupt or other operation in which a kernel thread is disrupted, a control point operation can be performed. A kernel thread is a kernel entity, like processes and interrupt handlers; it is the entity handled by the scheduler. A kernel thread runs in a user mode environment when executing user functions or library calls and can switch to a kernel mode environment when executing system calls. The control point operation is a data integrity operation in which an application state and memory contents for an application running on the kernel are written to storage at particular time points to provide a basis for resuming the kproc upon returning from the interrupt.

As mentioned above, interrupt handling should now operate in consideration of attacks/malicious code (e.g., Meltdown and Spectre) that can force a processor into allowing access to protected data in system memory. Accordingly, interrupt handlers now invalidate an L1 data cache and translation lookaside buffers (TLBs) during context switches between a user and a kernel operating on a given system, the user or system and interrupts occurring on the system, and/or the system and a hypervisor. This invalidation flushes data from the L1 data cache and TLBs prevents malicious code like Meltdown and Spectre from obtaining access to the data outside a confined region based on assigned data privilege (i.e., malware mitigation). Accordingly, additional time is needed to re-populate the L1 data cache and TLBs with data after flushing the L1 data cache and TLBs. However, flushing the L1 data cache and TLBs is not needed for all processes even when the interrupt handler operates in consideration of attacks/malicious code.

For example, a kernel has access to memory, processors and I/O of a given system. A kproc can access data that user processes cannot. Because kprocs have such system access, malware mitigation (e.g. Spectre mitigation) is not necessary for kprocs returning to a kernel mode from an interrupt mode. Accordingly, time and resources can be saved by not flushing the L1 data cache and TLBs in light of malware mitigation when a kproc is encountered. Various approaches can be used to address malware mitigation in a manner that protects against attacks/malicious code while saving compute time by not flushing processes that are related to the kernel (i.e., kprocs).

An approach for handling interrupts and interrupt context switching in order to reduce the number of cache/TLB flushes needed to run a workload while considering malware mitigation, associated with one or more embodiments of the present invention is that CPUs of the present computer system can be assigned to handle a given task. Each CPU can also be associated with a resource group in which each resource group handles a designated task. For example, a system can include 1024 CPUs (hardware or software), in which each CPU can be assigned to an Interrupt resource group, a kernel thread resource group and/or a user thread resource group. CPUs can be assigned exclusively to one resource group, or can be assigned to multiple resource groups. For example, interrupts can be assigned to CPUs (1020-1023) (i.e., interrupt steering), kernel threads can be assigned to CPUs (0-0123) and user threads can be assigned to CPUs (0-1019). CPU assignments can be tunable based on need and/or performance goals. Accordingly, the interrupt handler can steer interrupts requests to the assigned CPUs for handling interrupts (e.g., CPUs 1020-1023) exclusively for processing. By directing interrupts to CPUs assigned to the interrupt resource group, L1 cache/TLB flushes are reduced.

Another approach for handling interrupts and interrupt context switching in order to reduce the number of cache/TLB flushes needed to run a workload while considering malware mitigation, associated with one or more embodiments of the present invention is that a control point can be introduced into a resume path which bypasses L1 cache/TLB flushes when kernel threads are scheduled.

Figure 5:
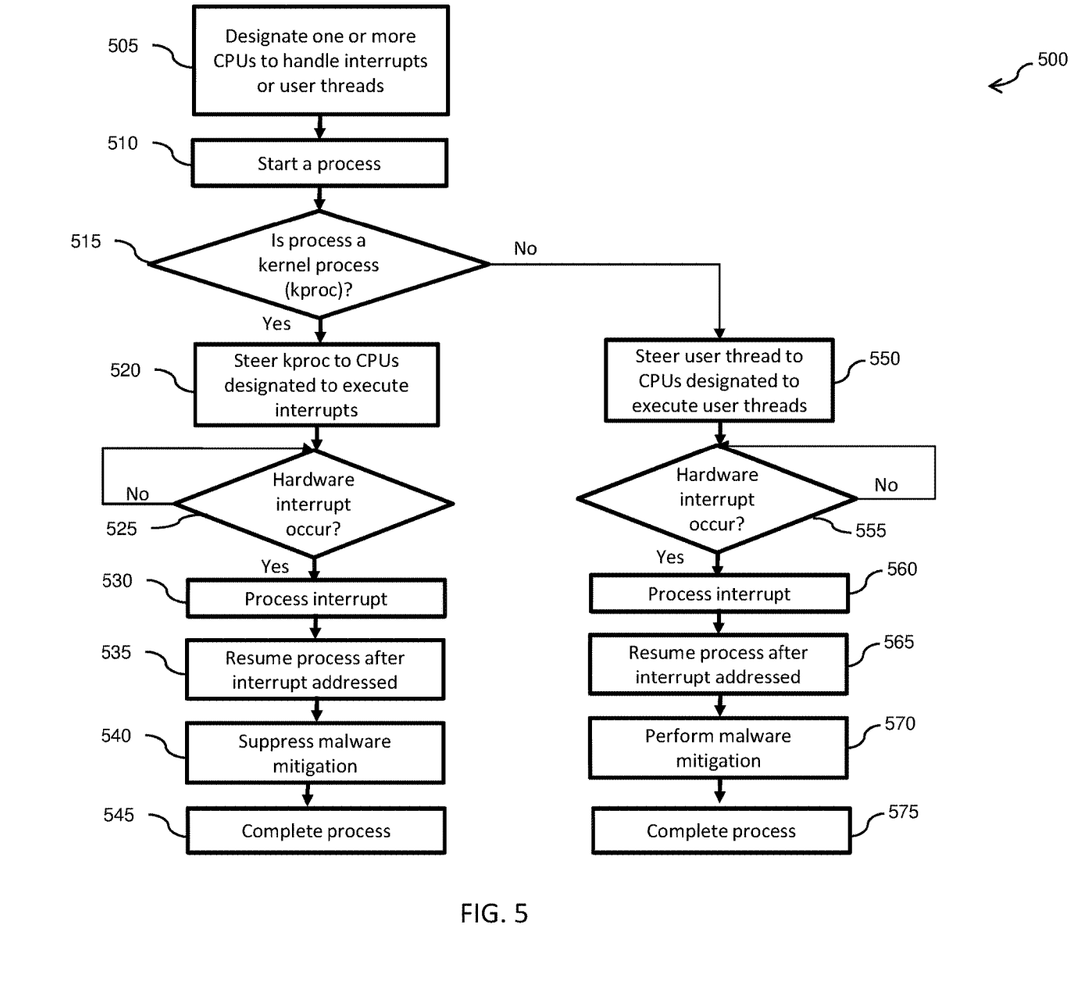
FIG. 5 is a flow diagram illustrating a method of performing Spectre mitigation on a workload according to one or more embodiments of the present invention.

FIG. 5 is a flow diagram 500 illustrating a computer-implemented method of performing malware mitigation on a workload according to one or more embodiments of the present invention. After starting at block 505, a computer system can designate one or more of a plurality of processors to a type of tasks (e.g., interrupt, kernel processes (kthreads), user processes, etc.). At block 510, a process can start on one or more computers of the computer system. At block 515, the computer-implemented method can determine if the process that has started is a kernel process. If the process is a kernel process (kproc), the computer-implemented method proceeds to block 520 where the computer system steers the kernel process to processor(s) designated to handle interrupts. At block 525, the computer-implemented method can determined whether an interrupt has occurred. If an interrupt has not occurred, the computer-implemented will return to block 525 and continue to monitor the ongoing kernel process for interrupts. If an interrupt has occurred, the computer-implemented method proceeds to block 530 where the processor(s) designated to handle interrupts processes the interrupt. At block 535, the kernel process resumes once the interrupt has been addressed. At block 540, malware mitigation (i.e. Spectre mitigation) can be suppressed to prevent flushing data from the L1 data cache and TLBs associated with the system in response to the encountered interrupt. At block 545, the computer-implemented method can complete the kernel process.

At block 515, if the process is not a kernel process (e.g., a user process), the computer-implemented method proceeds to block 550 where the computer system steers the process to processor(s) designated to user threads. At block 555, the computer-implemented method can determined whether an interrupt has occurred. If an interrupt has not occurred, the computer-implemented will return to block 555 and continue to monitor the ongoing process for interrupts. If an interrupt has occurred, the computer-implemented method proceeds to block 560 where the processor(s) designated to handle user threads processes the interrupt. At block 565, the process resumes once the interrupt has been addressed. At block 570, malware mitigation (i.e. Spectre mitigation) can be conducted to flush data from the L1 data cache and TLBs associated with the system in response to the encountered interrupt. At block 575, the computer-implemented method can complete the process.

Embodiments of the present invention can minimize the number of L1 Cache/TLB flushes required in consideration of Spectre mitigation while operating on the normal workloads. Flushing the L1 Cache/TLB can occur when any CPU in a system returns to a user mode after executing an interrupt. In an SMP environment, which uses multiple CPUs in the system, sets of CPUs can be designated to execute interrupts. The CPUs designated to execute interrupts do not handle user processes.

In addition, kernel threads (kthreads) can be allowed to run any CPU by having a complete system reset and a mechanism to steer interrupts to a subset of CPUs. Also, a control point can be introduced into the resume path to bypass flushing of these caches when kthreads are scheduled. CPUs assigned to handle a given process can be tuned based on kind of workload running on the system. Accordingly, if the workload of the system has more interrupts, more number of CPUs can be assigned to execute interrupts.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of performing malware mitigation on a workload, the method comprising:
    starting, by at least one processor of a plurality of processors, a process;
    determining, by the at least one processor of a plurality of processors, that the process is a kernel process;
    based on determining that the process is a kernel process:
        determining, by the at least one processor of the plurality of processors, that an interrupt has occurred;
        processing, by the at least one processor of the plurality of processors, the interrupt in response to determining that an interrupt has occurred; and
        suppressing, by the at least one processor of the plurality of processors, a malware mitigation to be applied to the kernel process in response to the interrupt being processed;
    designating one or more processors of the plurality of processors to handle interrupts and designating one or more processors of the plurality of processors to handle user threads;
    steering the process to the one or more processors of the plurality of processors designated to process the user threads in response to the determination that the process is not a kernel process; and
    performing the malware mitigation on the process in response to an interrupt occurring and to determining that the process is not a kernel process.

2. The computer-implemented method of claim 1 further comprising steeling the kernel process to one or more processors of the plurality of processors designated to process interrupts.

3. The computer-implemented method of claim 1, wherein the malware mitigation is a Spectre mitigation.

4. The computer-implemented method of claim 1 further comprising completing the started process.

5. A system, comprising:
    a plurality of processors; and
    a memory coupled to each of the plurality of processors; and
    a plurality of adapters coupled to the plurality of processors; wherein a processor of the plurality of processors executes to:
        start a process;
        determine that the process is a kernel process;
        based on determining that the process is a kernel process:
            determine that an interrupt has occurred;
            process the interrupt in response to determining that an interrupt has occurred; and
            suppress a malware mitigation to be applied to the kernel process in response to the interrupt being processed;
        designate one or more processors of the plurality of processors to handle interrupts and designating one or more processors of the plurality of processors to handle user threads;
        steer the process to the one or more processors of the plurality of processors designated to process the user threads in response to the determination that the process is not a kernel process; and
        perform the malware mitigation on the process in response to an interrupt occurring and to determining that the process is not a kernel process.

6. The system of claim 5, wherein the processor further executes to steer the kernel process to one or more processors of the plurality of processors designated to process interrupts.

7. The system of claim 5, wherein the malware mitigation is a Spectre mitigation.

8. The system of claim 5, wherein the processor further executes to complete the started process.

9. A computer program product for performing malware mitigation on a workload, the computer program product comprising:
    a non-transitory computer readable storage medium having stored thereon first program instructions executed by a processor of a plurality of processors to cause the processor to:
        start a process;
        determine that the process is a kernel process;
        based on determining that the process is a kernel process:
            determine that an interrupt has occurred;
            process the interrupt in response to determining that an interrupt has occurred; and
            suppress a malware mitigation to be applied to the kernel process in response to the interrupt being processed;
        designate one or more of the plurality of processors to handle interrupts and to designate one or more processors of the plurality of processors to handle user threads;
        steer the process to the one or more processors of the plurality of processors designated to process the user threads in response to the determination that the process is not a kernel process; and
        perform the malware mitigation on the process in response to an interrupt occurring and to determining that the process is not a kernel process.

10. The computer program product of claim 9, wherein the program instructions executed by the processor further cause the processor to steer the kernel process to one or more processors of the plurality of processors designated to process interrupts.

11. The computer program product of claim 9, wherein the malware mitigation is a Spectre mitigation.

* * * * *